US007998398B2

(12) United States Patent
Sunderman et al.

(10) Patent No.: US 7,998,398 B2
(45) Date of Patent: Aug. 16, 2011

(54) SLAG REMOVAL SYSTEM FOR A BURN TABLE

(75) Inventors: John R. Sunderman, Omaha, NE (US); Larry L. Minter, Jefferson, SD (US)

(73) Assignee: Owen Industries, Inc., Omaha, NE (US)

( * ) Notice: Subject to any disclaimer, the term of this patent is extended or adjusted under 35 U.S.C. 154(b) by 0 days.

(21) Appl. No.: 12/698,590

(22) Filed: Feb. 2, 2010

(65) Prior Publication Data
US 2010/0133730 A1 Jun. 3, 2010

Related U.S. Application Data

(62) Division of application No. 11/166,799, filed on Jun. 24, 2005, now abandoned.

(60) Provisional application No. 60/582,703, filed on Jun. 24, 2004.

(51) Int. Cl.
C21B 13/00 (2006.01)
C21B 15/00 (2006.01)
B23K 7/00 (2006.01)
(52) U.S. Cl. .......................................... 266/44; 148/194
(58) Field of Classification Search .................. 266/44, 266/48, 49, 65, 205, 232; 148/194
See application file for complete search history.

(56) References Cited

U.S. PATENT DOCUMENTS

| 2,931,484 A | 4/1960 | Muller et al. ................. 198/351 |
| 3,526,395 A | 9/1970 | Brown |
| 3,610,603 A | 10/1971 | Schmitz |
| 3,666,249 A | 5/1972 | MacLeod et al. |
| 3,701,514 A | 10/1972 | Walters et al. |
| 3,736,615 A | 6/1973 | Kumaki |
| 3,770,110 A | 11/1973 | Boskovitch |
| 3,784,176 A | 1/1974 | Walters et al. |
| 3,792,846 A | 2/1974 | Geffert |
| 3,850,086 A | 11/1974 | Walters et al. |
| 3,999,744 A | 12/1976 | Kotch |
| 4,058,299 A | 11/1977 | Lindkvist |
| 4,162,060 A * | 7/1979 | Anderson et al. ................ 266/49 |
| 4,220,318 A | 9/1980 | Anderson et al. |
| 4,390,167 A | 6/1983 | Ito et al. |
| 4,441,934 A | 4/1984 | Kawakami |
| 4,453,702 A | 6/1984 | Anderson et al. |

(Continued)

OTHER PUBLICATIONS

Application for Patent mailed Jun. 24, 2005.

(Continued)

Primary Examiner — Roy King
Assistant Examiner — Caitlin Fogarty
(74) Attorney, Agent, or Firm — Stinson Morrison Hecker LLP

(57) ABSTRACT

A pivoting door assembly for a downdraft cutting table assembly includes a door for covering a vent of the downdraft cutting table assembly, and an arm assembly coupled to the door. The downdraft cutting table assembly may include a cutting table for supporting a workpiece, a cutting torch assembly for positioning a cutting torch for cutting the workpiece, an exhaust duct for exhausting fumes, and a vent opening into the exhaust duct. The downdraft cutting table assembly may also include a slag removal system. The arm assembly is actuated by the cutting torch assembly as the cutting torch assembly positions the cutting torch over the cutting table. Actuation of the arm assembly by the cutting torch assembly causes the arm assembly to pivot the door open for allowing fumes from the cutting torch to be drawn into the exhaust duct.

6 Claims, 10 Drawing Sheets

U.S. PATENT DOCUMENTS

| | | | |
|---|---|---|---|
| 4,615,510 A | 10/1986 | Lehmler et al. | |
| 4,887,797 A | 12/1989 | Karow | |
| 4,930,756 A | 6/1990 | Brenneke | |
| 5,435,525 A | 7/1995 | Roy et al. | |
| 6,039,915 A | 3/2000 | Minter et al. | |
| 6,165,410 A | 12/2000 | Crees et al. | |
| 6,320,153 B1 | 11/2001 | Hulings et al. | |
| 6,437,286 B1 | 8/2002 | Scott | |
| 6,471,290 B1 | 10/2002 | Moody et al. | 297/188.2 |
| 6,664,495 B2 | 12/2003 | Yamaguchi et al. | |
| 6,727,457 B1 | 4/2004 | Vande Berg | |
| 7,011,789 B1 | 3/2006 | Bowlin et al. | |
| 7,560,064 B1 | 7/2009 | Crees et al. | |
| 2004/0202531 A1 | 10/2004 | Beransky et al. | |
| 2005/0140071 A1 | 6/2005 | Reist et al. | |

OTHER PUBLICATIONS

Examiner's Non-Final Rejection for U.S. Appl. No. 11/389,548 mailed Jun. 18, 2008.

Applicant's Response to Office Action for U.S. Appl. No. 11/389,548 of Jun. 18, 2008.

Examiner's Final Rejection for U.S. Appl. No. 11/389,548 mailed Dec. 12, 2008.

Applicant's Response to Final Office Action for U.S. Appl. No. 11/389,548 of Dec. 12, 2008.

International Search Report and Written Opinion dated Apr. 7, 2009 filed in PCT/US2009/034215, 7 pages.

Application for Patent filed Mar. 14, 2008, U.S. Appl. No. 12/075,962.

Application for Patent filed Jun. 24, 2005, U.S. Appl. No. 11/389,548.

Examiner's Non-Final Rejection for U.S. Appl. No. 11/389,548 mailed Jun. 18, 2008.

Applicant's Response to Office Action for U.S. Appl. No. 11/389,548 of Jun. 18, 2008.

Examiner's Final Rejection for U.S. Appl. No. 11/389,548 mailed Dec. 12, 2008.

Applicant's Response to Final Office Action for U.S. Appl. No. 11/389,548 of Dec. 12, 2008.

* cited by examiner

SLAG REMOVAL SYSTEM FOR A BURN TABLE

CROSS-REFERENCE TO RELATED APPLICATIONS

The present application is a divisional application of U.S. application Ser. No. 11/166,799 filed Jun. 24, 2005, now abandoned, which claims priority of U.S. Provisional Application Ser. No. 60/582,703, filed Jun. 24, 2004, both which are herein incorporated by reference in its entirety.

Additionally, the present application herein incorporates U.S. Pat. No. 6,039,915 entitled Burn Table and U.S. Pat. No. 6,165,410 entitled Downdraft Exhaust Cutting Table in their entirety.

FIELD OF THE INVENTION

The present invention generally relates to the field of metalworking, and more particularly to a pivoting door assembly for a downdraft cutting table assembly, such as a downdraft cutting table assembly including an exhaust duct, or the like.

BACKGROUND OF THE INVENTION

Cutting tables for cutting a workpiece such as a metal plate typically include a table surface for supporting the workpiece. A cutting torch assembly, which may include a plasma cutting torch, a laser cutting torch, or the like, may he suspended above the cutting table for cutting the metal plate. In some instances, the cutting torch may be utilized for repeatedly cutting the metal plate in an automated sequence, in order to follow a predetermined pattern or template.

Cutting the metal plate supported on the cutting table with the cutting torch may generate undesirable fumes, including smoke, as well as generating slag, which may accumulate under the cutting table. Water cutting tables have been provided which attempt to solve this problem by cutting a workpiece underwater. However, such tables may leave water spotting on bright finishes and create the risk of hydrogen entrapment when cutting an aluminum workpiece. Further, immersion of a workpiece may tend to cause the workpiece to rust. Another disadvantage of water cutting tables is the need to dispose of water potentially including contaminants after the cutting operation has been completed.

Downdraft cutting table assemblies, such as the cutting tables disclosed in U.S. Pat. Nos. 6,039,915 and 6,165,410, have been provided for removing undesirable fumes and slag from the vicinity of the cutting table by utilizing one or more exhaust ducts for evacuating the fumes, and a slag removal system for removing slag. Previously, such cutting tables have utilized pneumatically actuated venting systems. While these systems work well, they are complex and require pneumatic controllers to ensure proper actuation.

Consequently, it would he desirable to provide a door assembly for a downdraft cutting table assembly, such door assembly being mechanically actuated by the cutting torch assembly as it positions the cutting torch over the cutting table.

SUMMARY OF THE INVENTION

Accordingly, the present invention is directed to a pivoting door assembly for a downdraft cutting table assembly. The pivoting door assembly includes a door for covering a vent of the downdraft cutting table assembly and an arm assembly coupled to the door. The arm assembly is actuated by a cutting torch assembly as the cutting torch assembly positions a cutting torch over the cutting table. Preferably, the downdraft cutting table assembly is divided into a series of evacuation zones. By utilizing a series of pivoting door assemblies corresponding with a series of vents placed in these evacuation zones, the vacuum pressure within an exhaust duct provided with the downdraft cutting table assembly may he greatly reduced over a system configured to constantly evacuate the entire cutting table. Further, by providing actuation of the arm assembly via the cutting torch assembly, exhaust fumes and gases may he evacuated locally from the area in which the fumes are generated.

In exemplary embodiments of the invention, the downdraft cutting table assembly includes a cutting table for supporting a workpiece, a cutting torch assembly for positioning a cutting torch over the cutting table for cutting the workpiece (e.g., positioning the cutting torch in a horizontal plane above the workpiece), an exhaust duct for exhausting fumes produced when cutting the workpiece, and a vent opening into the exhaust duct for allowing the fumes to enter the exhaust duct. Additionally, the downdraft cutting table assembly may include a slag removal system.

Actuation of the arm assembly by the cutting torch assembly causes the arm assembly to pivot open the door to allow the fumes from the cutting torch to be drawn into the exhaust duct. In this manner, the pivoting door assembly is mechanically actuated by the cutting torch assembly as the cutting torch assembly positions the cutting torch over the cutting table.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
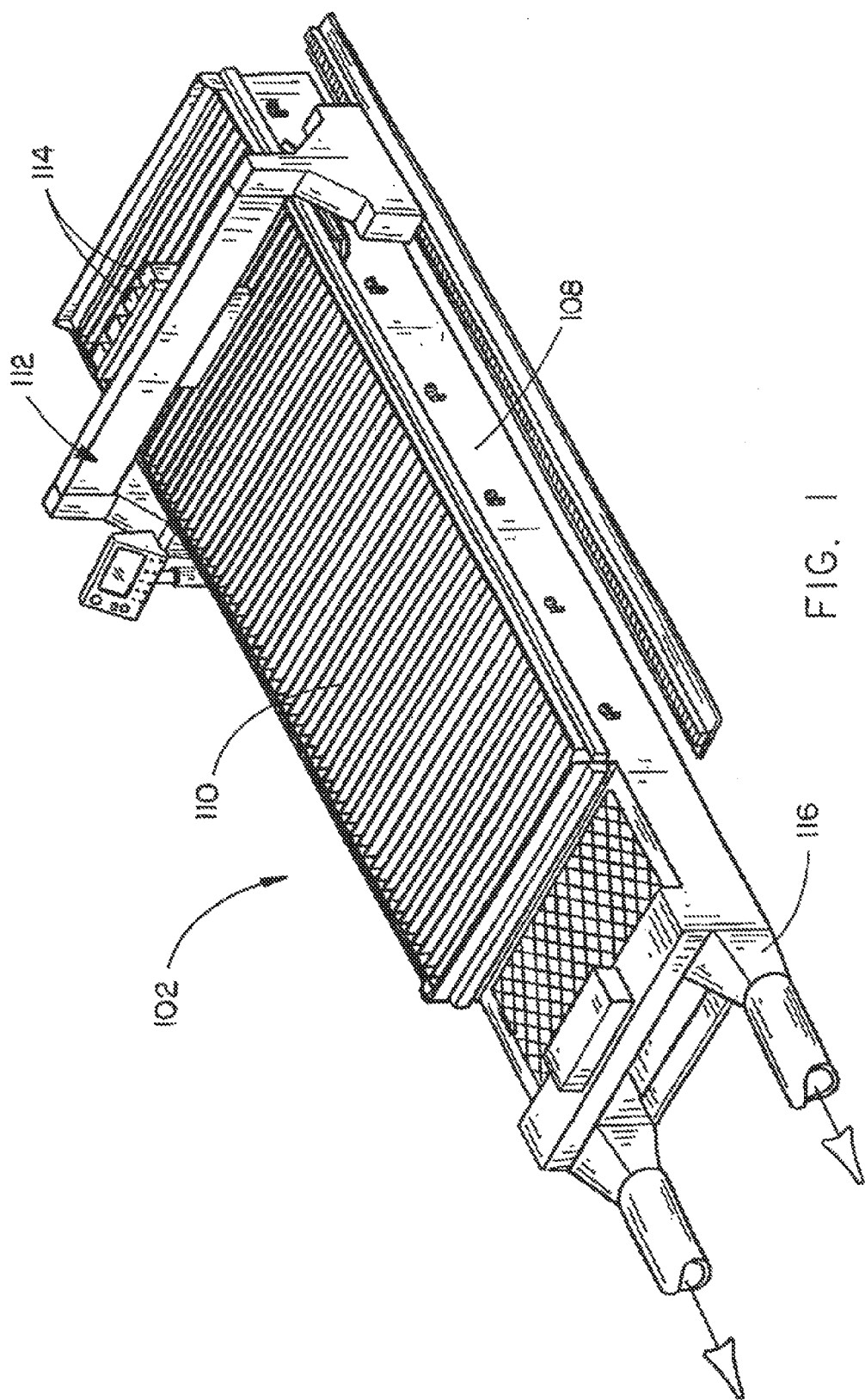
FIG. 1 is an isometric view illustrating a downdraft cutting table assembly including a pivoting door assembly in accordance with an exemplary embodiment of the present invention.
Figure 2:
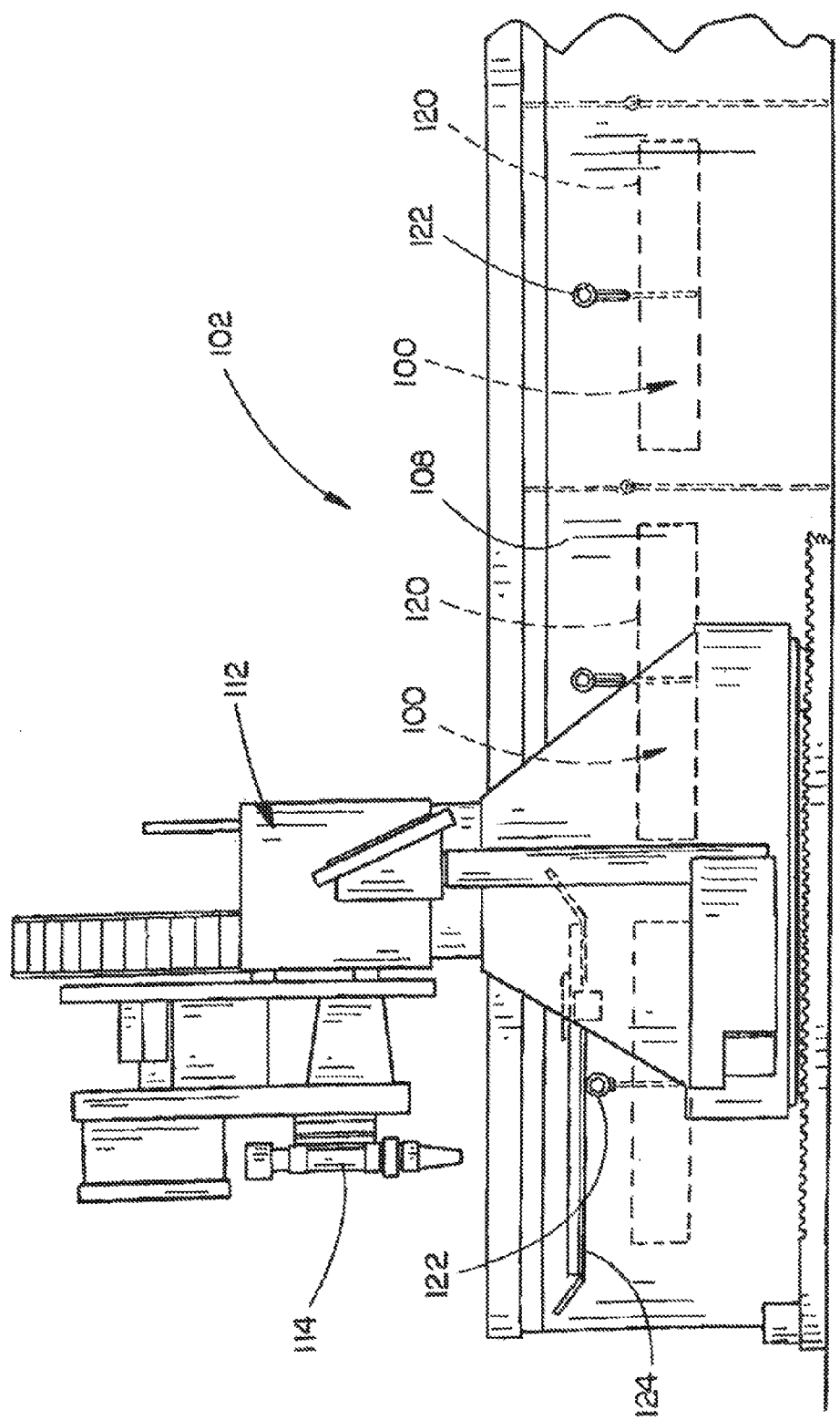
FIG. 2 is a partial side elevation view of the downdraft cutting table assembly illustrated in FIG. 1.
Figure 3:
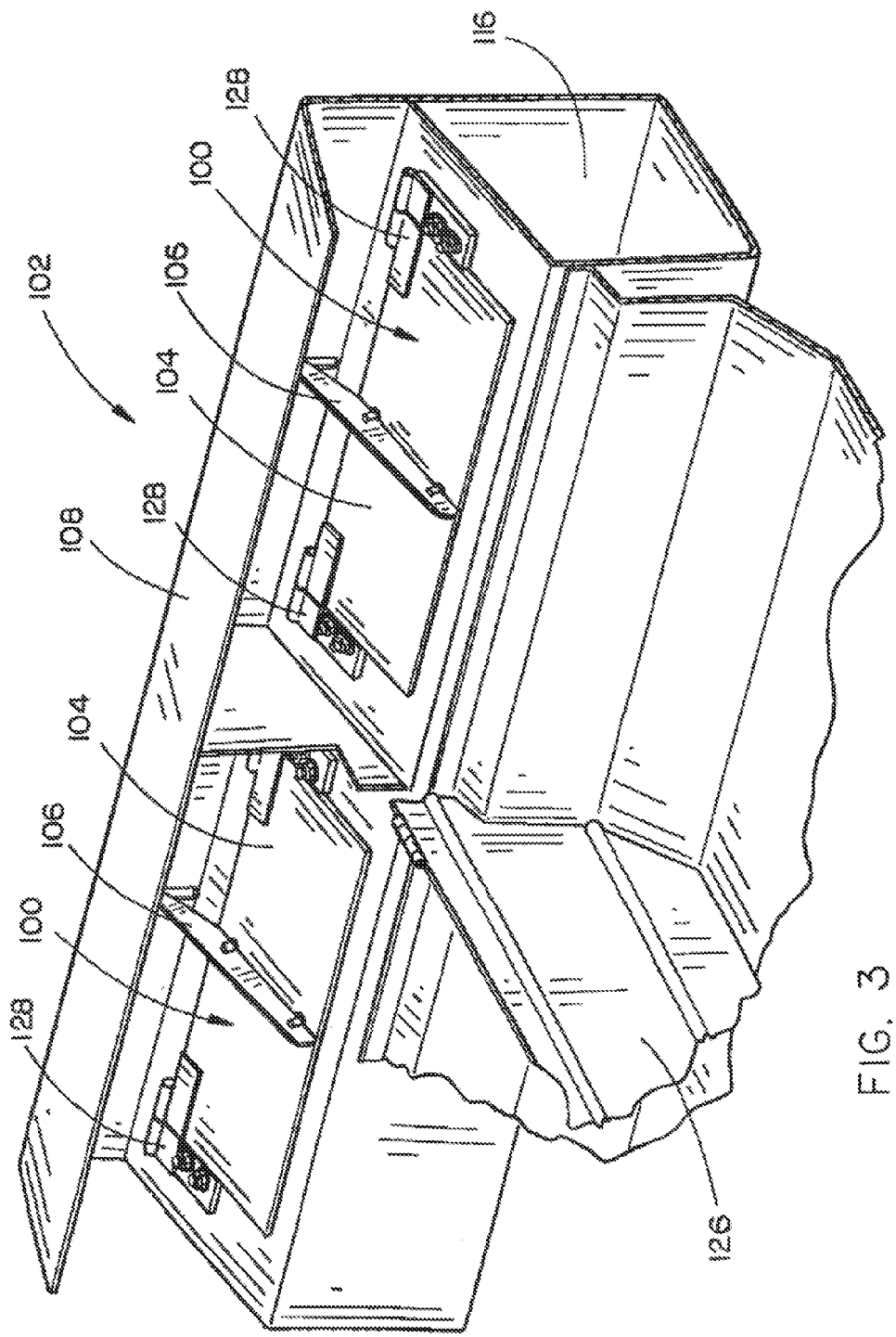
FIG. 3 is a partial isometric view of the downdraft cutting table assembly illustrated in FIG. 1.
Figure 4:
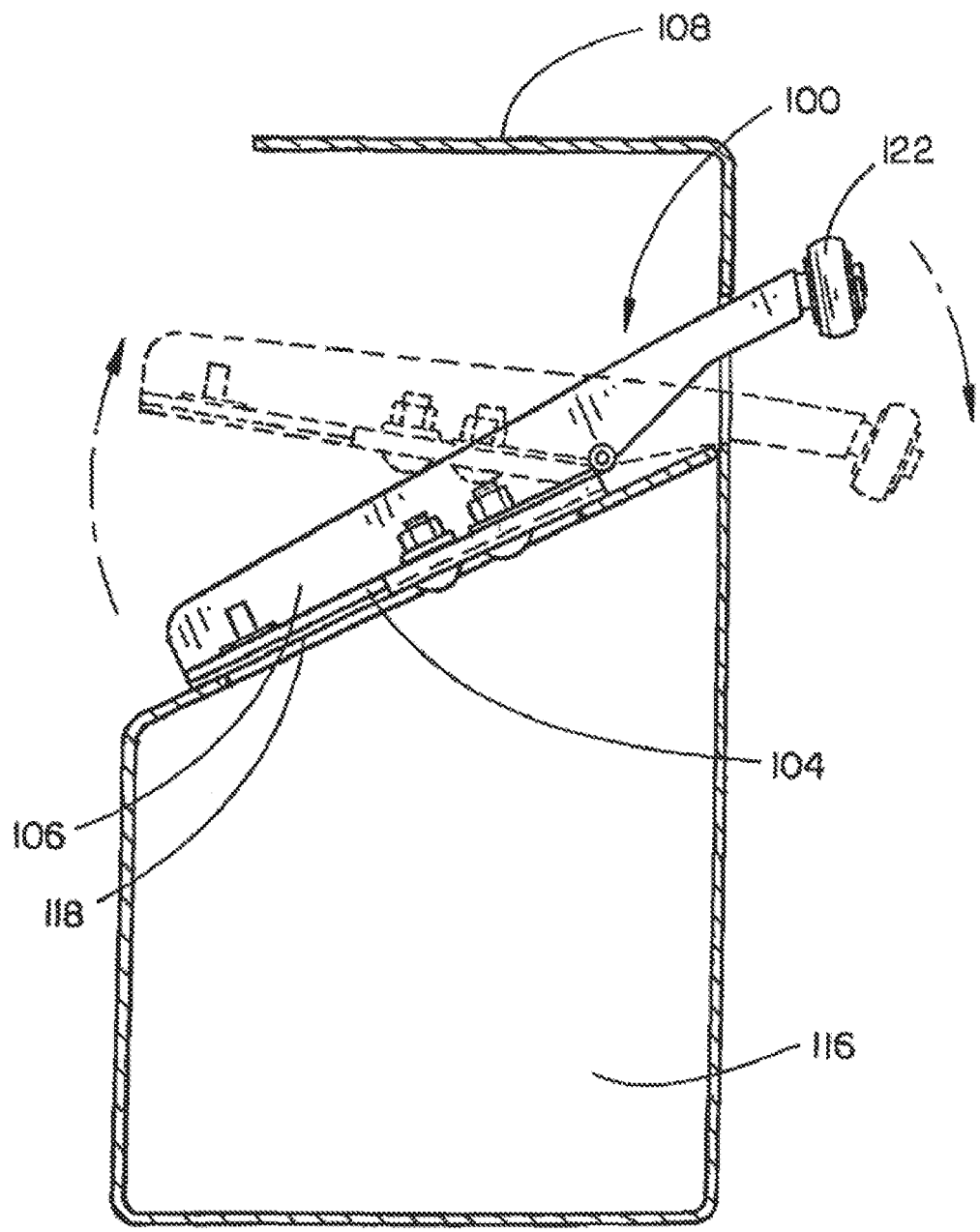
FIG. 4 is a cross-sectional end elevation view of an exhaust duct for the downdraft cutting table assembly illustrated in FIG. 1, wherein pivoting action of the pivoting door assembly is illustrated.
Figure 5:
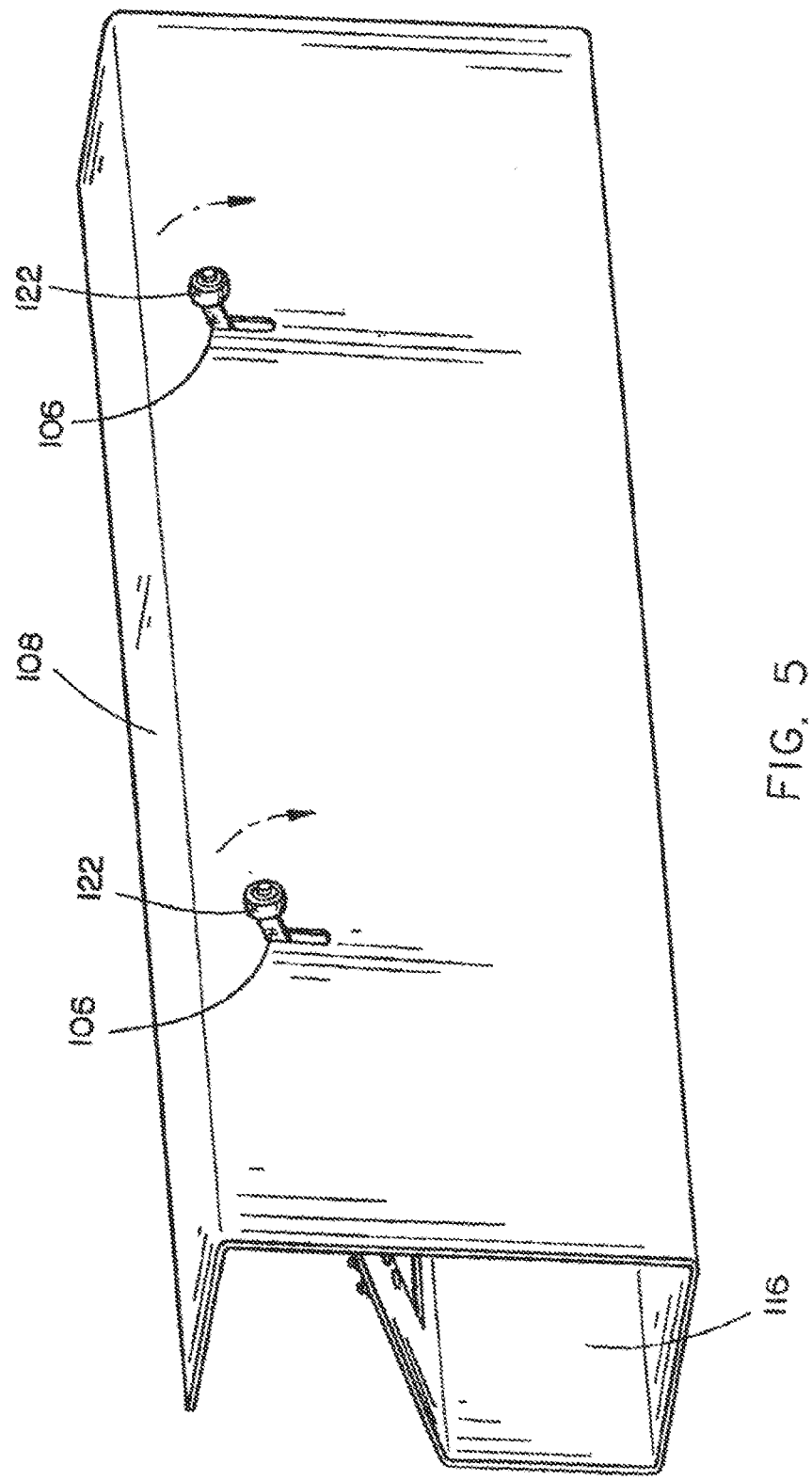
FIG. 5 is a partial isometric view of the exhaust duct illustrated in FIG. 4.
Figure 6:
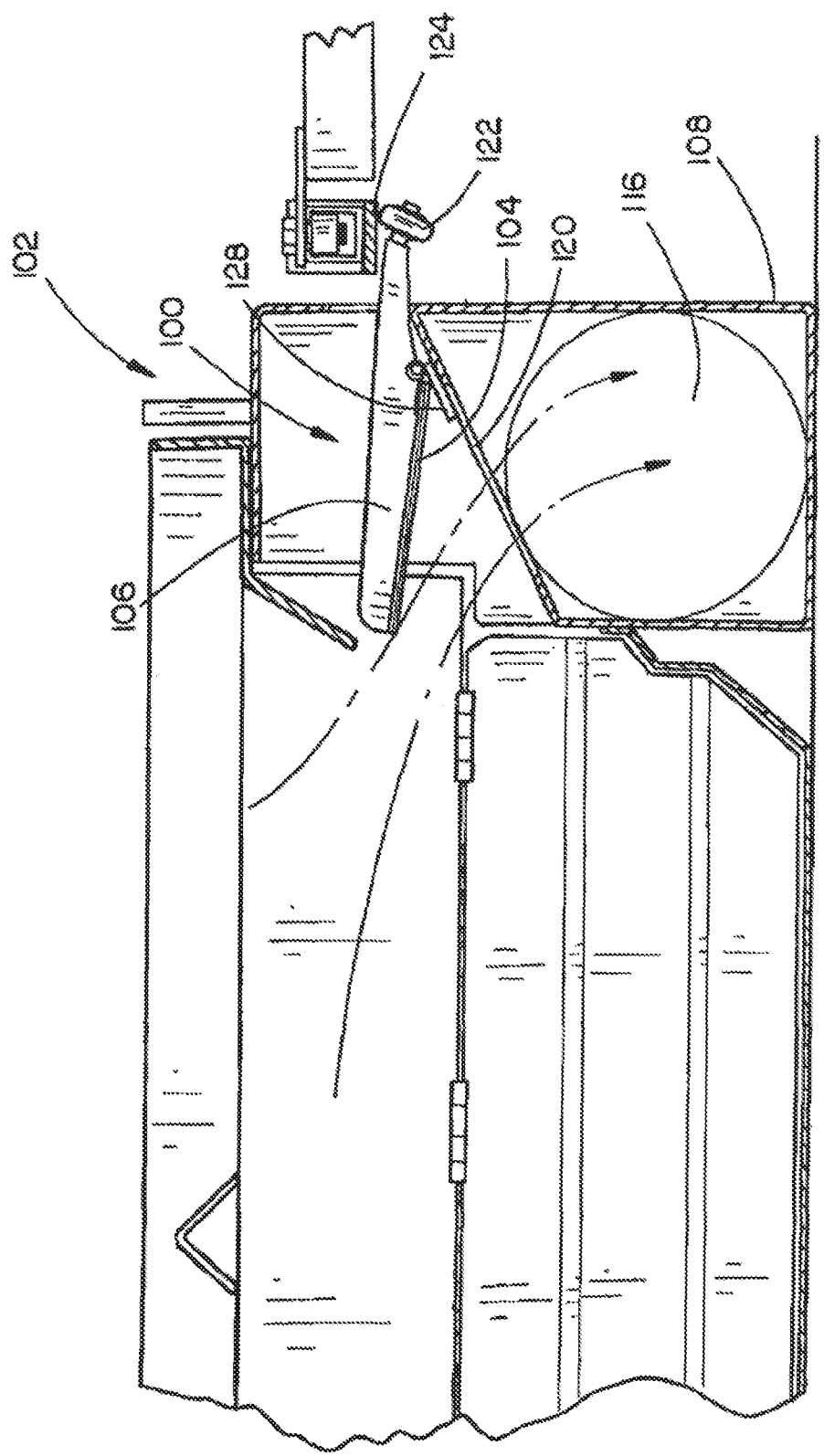
FIG. 6 is a partial end elevation view of the downdraft cutting table assembly illustrated in FIG. 1, wherein evacuation of exhaust fumes is illustrated.
Figure 7:
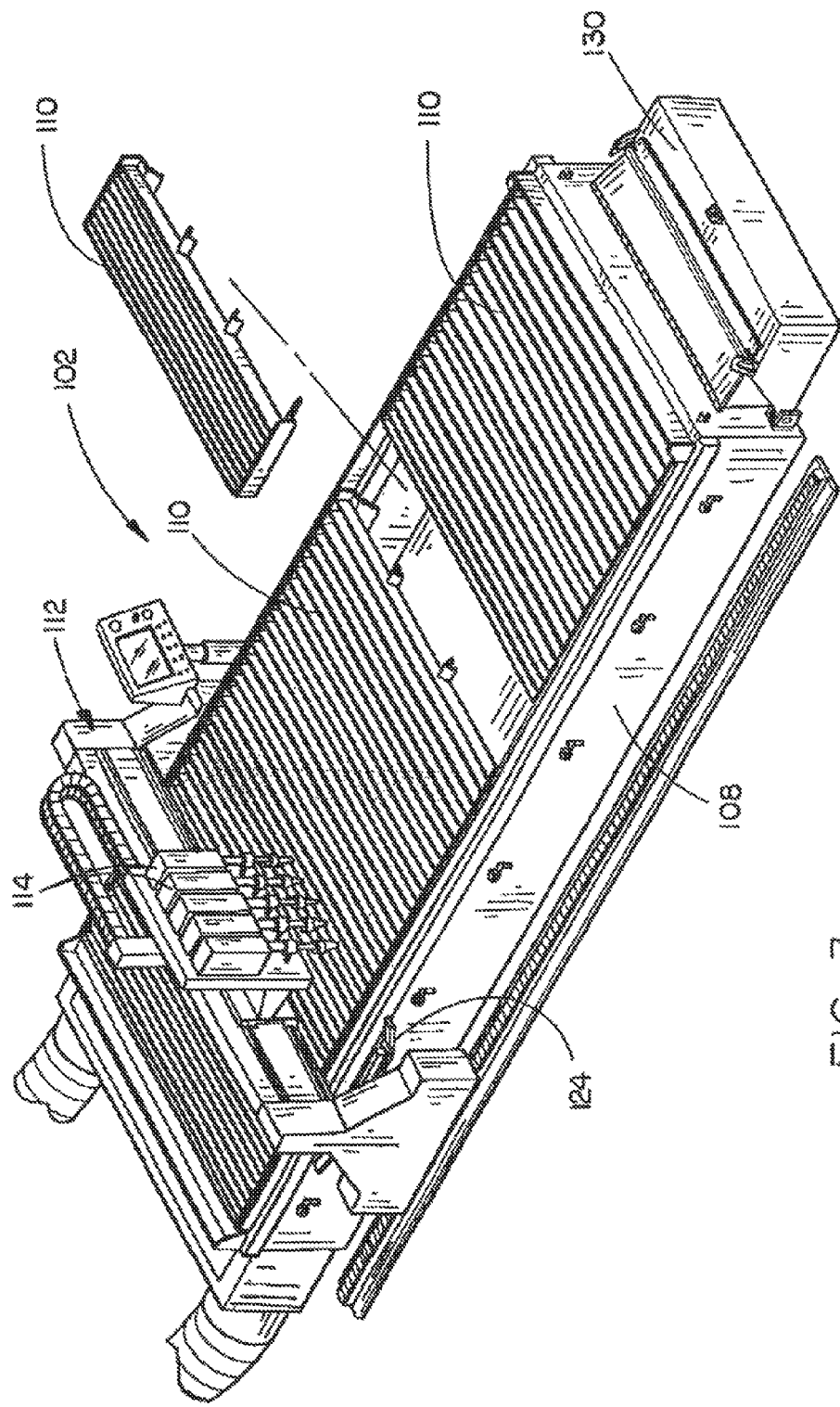
FIG. 7 is an isometric view of the downdraft cutting table assembly illustrated in FIG. 1.
Figure 8:
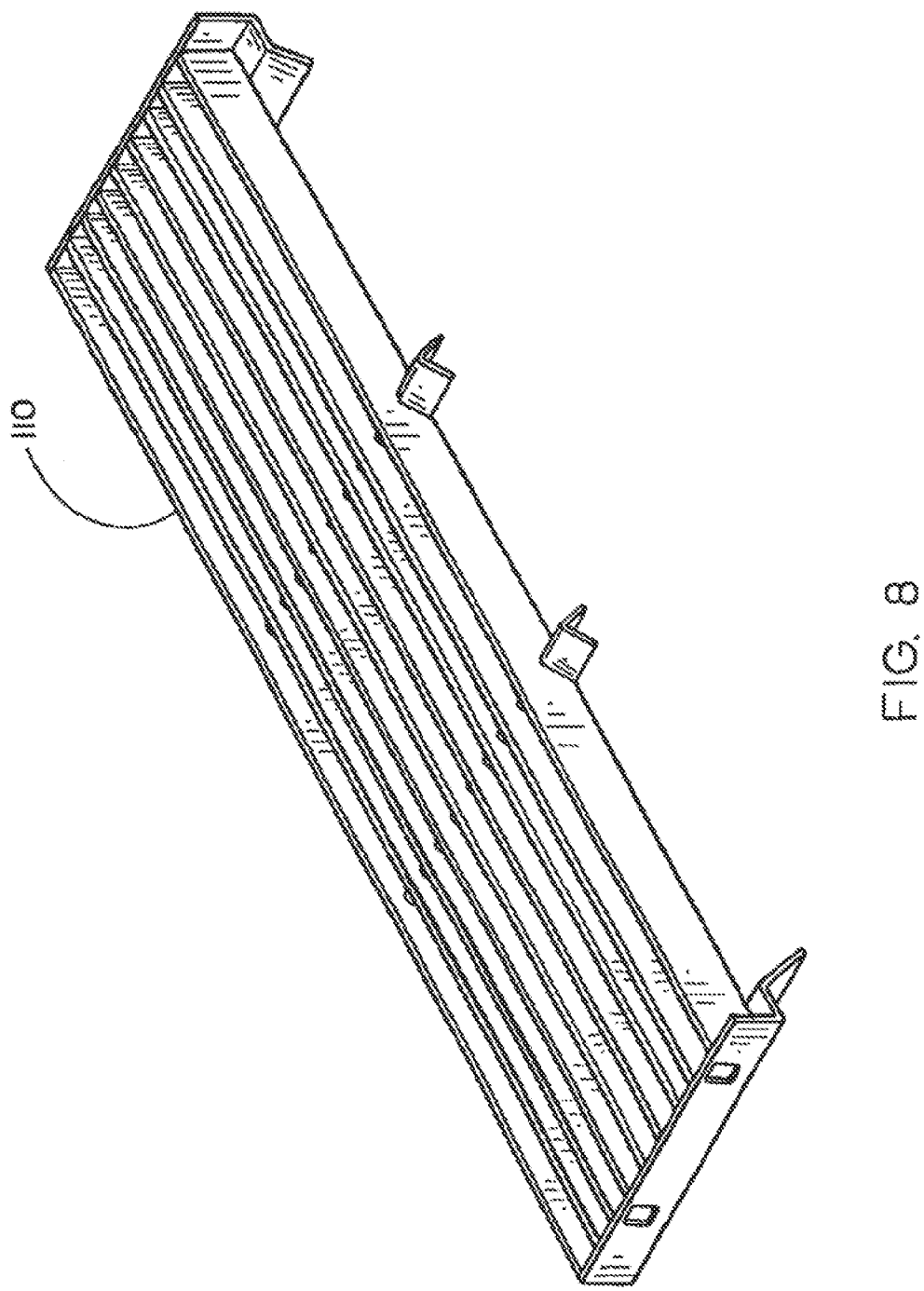
FIG. 8 is an isometric view illustrating slats for a downdraft cutting table assembly in accordance with an exemplary embodiment of the present invention.

Reference will now be made in detail to the presently preferred embodiments of the invention, examples of which are illustrated in the accompanying drawings.

Referring generally to FIGS. 1 through 11, a pivoting door assembly 100 is described in accordance with exemplary embodiments of the present invention. In one specific embodiment, the pivoting door assembly 100 is utilized with a downdraft cutting table assembly 102. The pivoting door assembly 100 includes a door 104 and an arm assembly 106 coupled to the door 104. Preferably, the door 104 is formed of a metal plate or a like material for withstanding the environment of the downdraft cutting table assembly 102, e.g., for withstanding fumes and slag generated by cutting operations performed with the cutting table assembly 102. Similarly, the arm assembly 106 may be constructed from a like material having sufficient durability and longevity far the environment of the cutting table assembly 102. In one specific embodiment, the arm assembly 106 is welded to the door 104, while in another embodiment the arm assembly 106 and the door 104 are integrally formed through casting, co-molding, or the like. Further, those of skill in the art will appreciate that the arm assembly 106 and the door 104 may be treated for protection from fumes, slag, and corrosion without departing from the scope and intent of the present invention, such as by anodizing with a protective oxide, galvanizing with zinc, or the like.

In exemplary embodiments of the present invention, the downdraft cutting table assembly 102 includes a cutting table 108 for supporting a workpiece such as a metal plate, or the like. The cutting table 108 comprises an elongated, horizontally orientated, generally rectilinear support surface. The cutting table 108 includes a series of spaced apart slats 110 upon which the workpiece is supported. A cutting torch assembly 112 is included with the downdraft cutting table assembly 102 for positioning a cutting torch 114 over the cutting table 108 for cutting the workpiece.

The cutting torch assembly 112 is comprised of a carriage supporting the cutting torch 114 and is movable along the length of the cutting table 108 to cut a workpiece positioned on the cutting table 108. Suitable cutting torches include plasma cutting torches and laser cutting torches. It is contemplated that other cutting torches may be utilized as well, without departing from the scope and intent of the present invention. The downdraft cutting table assembly 102 includes an exhaust duct 116 for exhausting fumes including smoke and gases produced when cutting the workpiece. One or more exhaust ducts 116 are positioned beneath the cutting table 108 and run parallel to the length of the cutting table 108. In an exemplary embodiment, the exhaust duct 116 is connected to an exhaust system including an air handler for creating a vacuum pressure within the exhaust duct 116 in order to draw the fumes into the exhaust duct 116.

Preferably, a series of vents 120 open into the exhaust duct 116 permitting the fumes to enter the exhaust duct 116. The vents 120 are horizontally spaced-apart exhaust openings formed in the exhaust duct 116. The door 104 of the pivoting door assembly 100 is configured for covering at least one of the vents 120. The door 104 is normally closed. In an embodiment, each vent 120 is covered by a corresponding door 104. In further embodiments, the door 104 may be utilized for covering more than one vent 120 without departing from the scope and intent of the present invention. The arm assembly 106 coupled to the door 104 is actuated by the cutting torch assembly 112 as the cutting torch assembly 112 positions the cutting torch 114 over the cutting table 108 for cutting the workpiece.

For example, in a specific embodiment, the arm assembly 106 includes a cam roller 122 for actuation by the cutting torch assembly 112, which includes a ski 124. In embodiments, the cam roller comprises a roller connected to the end of the arm assembly 106. The ski 124 of the cutting torch assembly 112 passes over and depresses the cam roller 122 included in the arm assembly 106, rotating the arm assembly 106 and causing the arm assembly 106 to pivot the door 104 open (i.e., into an open orientation) thereby allowing the fumes generated by the cutting torch 114 to be drawn into the exhaust duct 116. Once the cutting torch assembly 112 has passed over the vent 120, the ski 124 included in the cutting torch assembly 112 disengages the cam roller 122 allowing the door 104 to pivot to a closed orientation. Preferably, the ski includes angled or curved first and second portions for smoothly transitioning the pivoting door assembly 100 from the closed orientation to the open orientation and back to the closed orientation as the cutting torch assembly 112 moves along the cutting table 108. However, in other embodiments, only the angled/curved first portion is provided for smoothly opening the door 104. Further, those of skill in the art will appreciate that the ski 124 may be formed in a variety of ways for depressing the cam roller 122 of the arm assembly 106, including the utilization of other geometries without departing from the scope and intent of the present invention.

In specific embodiments, the downdraft cutting table assembly 102 is divided into a series of zones by the vents 120 opening into the exhaust duct 116. For example, a series of gates 126 may be provided for generally directing fumes from spaces between the gates 126 and exhausting the fumes through vents, 120 corresponding with each zone. The gates 126 arc Vertically disposed and horizontally spaced, extending laterally from the exhaust duct 116 to one side of the cutting table 108 beneath the cutting table 108 to define a plurality of ventilation zones. Thus, a first vent 120 connects a first zone to the exhaust duct 116, and the arm assembly 106 is actuated by the cutting torch assembly 112 as the cutting torch assembly 112 positions the cutting torch 114 over the first zone. In exemplary embodiments, the downdraft cutting table assembly 102 includes a slag collector for removing slag from beneath the cutting table 108. The slag collector is selectively movable along the length of the cutting table 108 so as to be positioned beneath the cutting torch assembly 112 for removing slag which is created by the material being cut and which falls downwardly from the cutting table. The gates 126 are movably mounted so that the slag collector may pass through them. Thus, the slag collector pushes through each of the gates 126 in succession, corresponding with the positioning of the cutting torch assembly 112. At an end of the cutting table 108, a bucket 130 may be provided for collecting slag pushed into the bucket by the slag collector.

Figure 9:
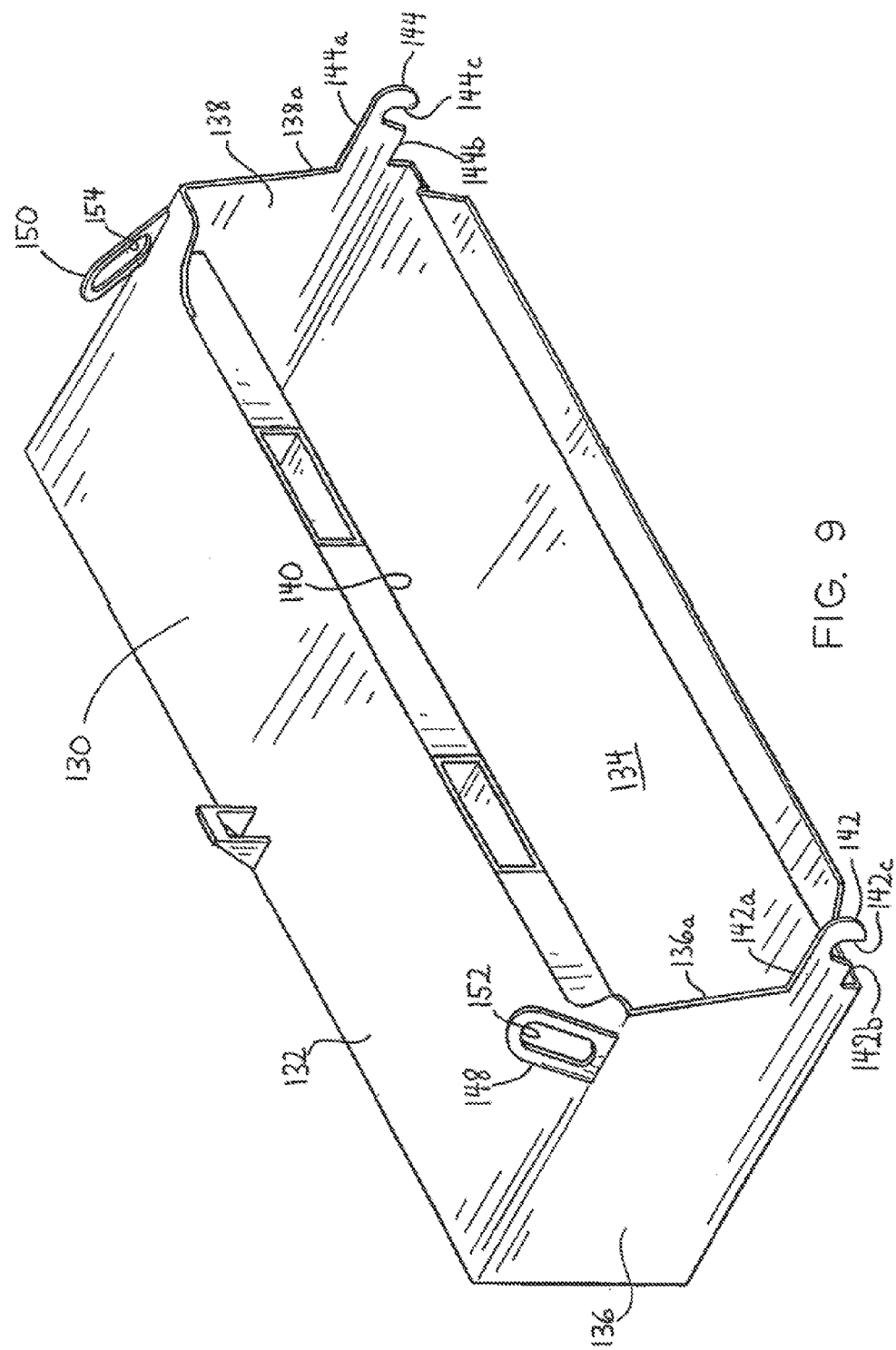
FIG. 9 is an isometric view illustrating a bucket for a downdraft cutting table assembly in accordance with an exemplary embodiment of the present invention.
Figure 10:
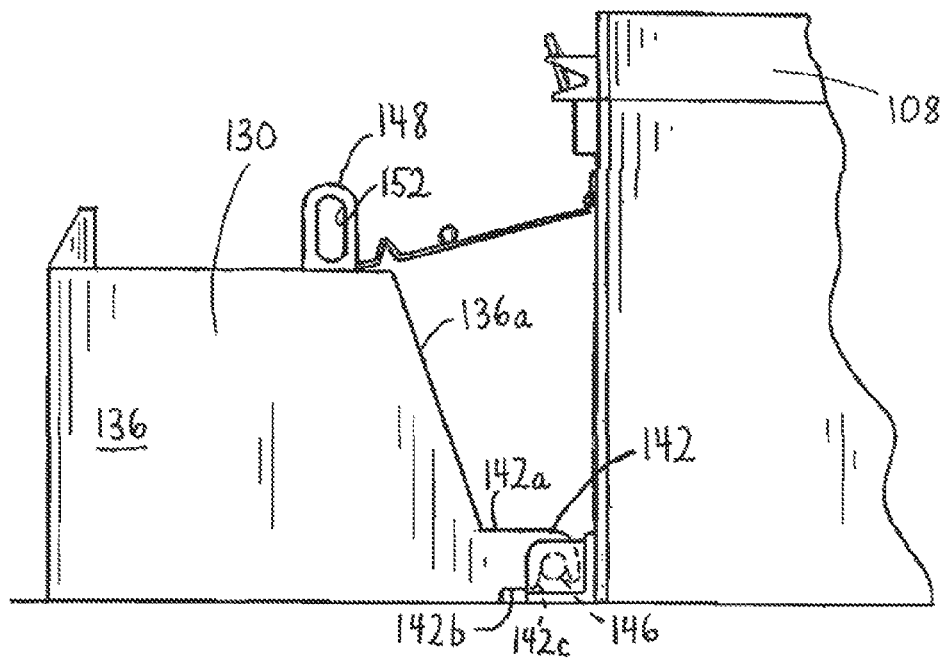
FIG. 10 is a partial side elevation view of the downdraft cutting table assembly illustrated in FIG. 1, wherein a bucket is attached to an end of the cutting table for collecting slag from a cutting operation.
Figure 11:
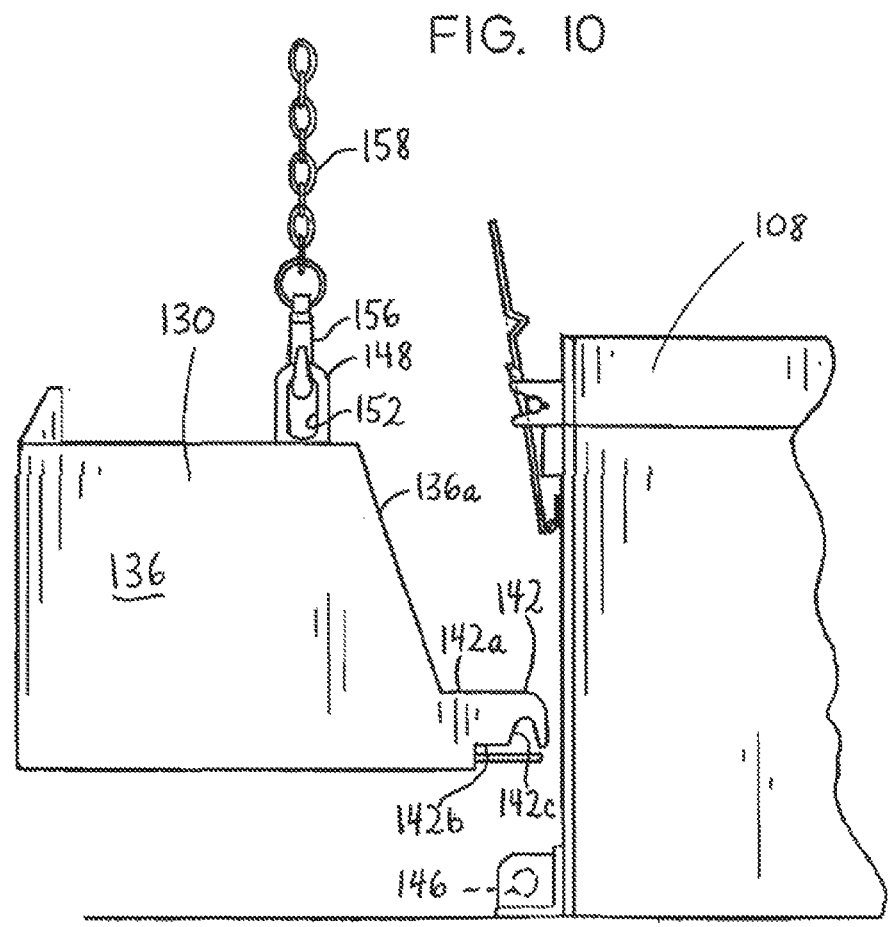
FIG. 11 is a partial side elevation view of the downdraft cutting table assembly illustrated in FIG. 10, wherein removal of the bucket is illustrated.

Referring to FIGS. 9-11, the bucket 130 has a top plate 132, a bottom plate 134, and opposing end plates 136 and 138 extending between the top and bottom plates 132 and 134 to define a front bucket opening 140. The bucket 130 also has a back plate, shown in FIG. 7, joined to the top plate 132, bottom plate 134, and end plates 136 and 138 opposite the front opening 140. The bucket 130 has an attachment lug 142 that is joined with and extends from a front edge 136a of end plate 136 in a direction generally parallel to top plate 132. An attachment lug 144 is also joined with and extends from a front edge 138a of end plate 138 in a direction generally parallel to top plate 132. Attachment lug 142 has upper and lower edges 142a and 142b that extend in a direction generally parallel to top plate 132, and attachment lug 144 has upper and lower edges 144a and 144b that extend in a direction generally parallel to top plate 132. A slot 142c extends upward from the lower edge 142b of attachment lug 142, and a slot 144c extends upward from the lower edge 144b of attachment lug 144. Slot 142c is configured to removably engage with a pin 146 (see FIGS. 10 and 11) that extends from a portion of the frame of the cutting table 108. Slot 144c is also configured to removably engage with a pin (not shown) that extends from an opposite side of the cutting table frame as pin 146. A pair of tabs 148 and 150 are joined with and extend upward from the peripheral edge of top plate 132. Each tab 148 and 150 has an opening 152 and 154. As shown in FIG. 11, opening 152 is configured to receive a hook 156 that is joined to the end of an elongate chain 158. Opening 154 is also configured to receive a hook (not shown) on another elongate chain (not shown).

In exemplary embodiments, the door 104 of the pivoting door assembly 100 is biased closed by its own weight for preventing air from being drawn into the exhaust duct 116 through the vent 120 until the arm assembly 106 is actuated by the cutting torch assembly 112. For example, a metal plate included with the door 104 may be pivotally supported by a hinge 128 for rotationally coupling the door 104 with the exhaust duct 116. In other embodiments, it is contemplated that the hinge 128 may rotationally couple the door 104 with the cutting table 108, without departing from the scope and intent of the present invention. Preferably, the door 104 and the arm assembly 106 are biased by the placement of the hinge 128 such that the pivoting door assembly 100 is biased closed by the weight of the door 104. However, in other embodiments, it is contemplated that other techniques may be utilized for biasing the pivoting door assembly 100 closed, such as a spring hinge, a counterweight, and the like.

Preferably, the pivoting door assembly 100 includes a seal 118 for preventing air from being drawn into the exhaust duct 116 through the vent 120 until the arm assembly 106 is actuated by the adjacent cutting torch assembly 112. For example, the seal 118 may be disposed between the door and the exhaust duct. Compression of the seal 118 by the weight of the door 104 may aid in sealing the pivoting door assembly 100 when the pivoting door assembly is closed. In one specific embodiment, the seal 118 is adhered to the door 104, such as being disposed around its periphery. In another specific embodiment, the seal is adhered to the exhaust duct 116, such as being disposed around the periphery of the vent 120. It is contemplated that the seal may be adhered in a variety of different ways, and may comprise a variety of different materials.

While the accompanying figures illustrate a downdraft cutting table assembly 102 having a cutting table 108 including two exhaust ducts 116 disposed on two sides of the cutting table, it is contemplated that the pivoting door assembly 100 of the present invention may also be utilized with a double-wide cutting table having an exhaust duct running between two sides of the cutting table. Such a configuration would not be outside the scope of the present invention. For example, an arm assembly 106 of the pivoting door assembly 100 could be actuated by a slag collector connected to the cutting torch assembly 112. Moreover, it will be appreciated that the cutting torch assembly 112 may be configured for actuating the arm assembly 106 of the pivoting door assembly 100 in a variety of ways in this configuration.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for removing slag from a downdraft cutting table assembly, said table assembly comprising a frame, a pin extending from said frame, a support surface for supporting a workpiece, said support surface affixed to said frame, and a bucket configured to removably attach to said frame at an end of said table assembly, wherein said bucket comprises an attachment lug protruding from a front edge of said bucket, said attachment lug comprising a slot, said method comprising:
removably attaching said bucket to said frame by positioning said bucket such that said slot removably engages said pin;
collecting slag with said bucket; and
removing said bucket from attachment with said frame.

2. The method of claim 1, wherein said bucket comprises a top plate, a bottom plate, and opposing end plates extending between said top and bottom plates to define a front bucket opening, wherein said attachment lug extends from one of said end plates in a direction that is generally parallel with said top plate.

3. The method of claim 2, wherein said attachment lug comprises upper and lower edges extending in a direction generally parallel to said top plate, and wherein said slot in said attachment lug extends upward from said lower edge.

4. A method for removing slag from a downdraft cutting table assembly, said table assembly comprising a frame, a support surface affixed to said frame, a bucket configured to removably attach to said frame at an end of said table assembly, and a slag collector positioned beneath said support surface, said method comprising:
removably attaching said bucket to said frame;
pushing slag into said bucket with said slag collector by moving said slag collector along a length of said table assembly; and
removing said bucket from attachment with said frame.

5. The method of claim 4, further comprising positioning a workpiece on said support surface, and cutting said workpiece such that slag falls beneath said support surface.

6. The method of claim 4, wherein said table assembly comprises a pin extending from said frame, wherein said bucket comprises an attachment lug protruding from a front edge of said bucket, said attachment lug comprising a slot, wherein said step of removably attaching said bucket to said frame comprises positioning said bucket such that said slot removably engages said pin.

* * * * *